US008811517B2

(12) United States Patent
Ihm et al.

(10) Patent No.: US 8,811,517 B2
(45) Date of Patent: Aug. 19, 2014

(54) WIRELESS COMMUNICATION SYSTEM FOR A HIGH-SPEED OBJECT THAT MOVES ON A FIXED PATH

(75) Inventors: Bin Chul Ihm, Anyang-si (KR); Ji Won Kang, Anyang-si (KR); Sung Ho Park, Anyang-si (KR); Wook Bong Lee, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 147 days.

(21) Appl. No.: 13/503,301

(22) PCT Filed: Oct. 26, 2010

(86) PCT No.: PCT/KR2010/007390
§ 371 (c)(1),
(2), (4) Date: Apr. 20, 2012

(87) PCT Pub. No.: WO2011/062376
PCT Pub. Date: May 26, 2011

(65) Prior Publication Data
US 2012/0219084 A1 Aug. 30, 2012

Related U.S. Application Data

(60) Provisional application No. 61/262,153, filed on Nov. 18, 2009.

(30) Foreign Application Priority Data

Sep. 1, 2010 (KR) .................. 10-2010-0085353

(51) Int. Cl.
*H04B 7/02* (2006.01)
(52) U.S. Cl.
USPC ........... 375/267; 375/260; 375/259; 375/216; 375/295; 370/252; 370/335; 370/342

(58) Field of Classification Search
USPC .......... 375/267, 260, 259, 216, 295; 370/252, 370/335, 342
See application file for complete search history.

(56) References Cited

U.S. PATENT DOCUMENTS

| | | | |
|---|---|---|---|
| 2004/0248618 A1* | 12/2004 | Yoshii et al. ............... | 455/562.1 |
| 2009/0232510 A1 | 9/2009 | Gupta et al. | |
| 2011/0200071 A1* | 8/2011 | Hamaguchi et al. .......... | 375/130 |

FOREIGN PATENT DOCUMENTS

| | | |
|---|---|---|
| EP | 1895680 A2 | 3/2008 |
| WO | 2007/091836 A1 | 8/2007 |
| WO | 2009/128657 A2 | 10/2009 |

OTHER PUBLICATIONS

Ofuji et al. "Filed Experimental Results of E-UTRA Downlink with precoding and non-precoding MIMOP", 2009 IEEE 69th Vehicular technology conference, pp. 1-5, Apr. 29, 2009.

(Continued)

*Primary Examiner* — Zewdu Kassa
(74) *Attorney, Agent, or Firm* — Mckenna Long & Aldridge LLP

(57) ABSTRACT

The present invention relates to a method for sending a data signal from a transmitter to a receiver in a multiple antenna wireless communication system. In particular, the method comprises: sending information about the number of transmission antennas of the transmitter to the receiver; receiving from the receiver information about the number of effective communication links of the transmitter and the receiver; determining a precoding matrix based on the information about the number of effective communication links; and receiving from the receiver the data signal using the precoding matrix, wherein transmission antennas of the transmitter and receiving antennas of the receiver respectively form effective communication links independent of each other.

10 Claims, 4 Drawing Sheets

(56) References Cited

OTHER PUBLICATIONS

Haustein et al. "Real-time signal processing for multiantenna systems: algorithms, optimization, and implementation on an experimental test-bed", EURASIP Journal on Applied Signal Processing, vol. 2006, pp. 1-21, Jan. 1, 2006.

* cited by examiner

WIRELESS COMMUNICATION SYSTEM FOR A HIGH-SPEED OBJECT THAT MOVES ON A FIXED PATH

This Application is a 35 U.S.C. §371 National Stage entry of International Application No. PCT/KR2010/007390, filed Oct. 26, 2010, and claims the benefit of U.S. Provisional Application No. 61/262,153, filed Nov. 18, 2009, and Korean Application No. 10-2010-0085353, filed Sep. 1, 2010, all of which are incorporated by reference in their entirety herein.

TECHNICAL FIELD

The present invention relates to a wireless communication system, and more particularly, to a wireless communication system for a high-speed object moving on a fixed path.

BACKGROUND ART

A 4G cellular communication system which is currently being discussed is designed based on one basic frame and is designed to provide optimized performance to a user who moves at a low speed. Such a system is designed to support a user who moves at a speed of 350 km/h, but the performance thereof is inferior to that of a user who moves at a low speed. If such a cellular communication system is applied to a high-speed train, link quality between a network and the high-speed train is deteriorated and sufficient link capacity cannot be ensured due to high mobility of 350 km/h. If the speed of the high-speed train will exceed 500 km/h in the future due to technological development, performance deterioration will become more serious and quality of a wireless data service provided to a passenger will be significantly decreased. If a scenario in which a high-speed train uses some capacity of a macro base station (BS) is used, data communication of other users in a cell may be deteriorated.

Accordingly, instead of wireless communication, wired communication may be used for communication between a network and a high-speed train. For example, communication between a high-speed train and a network may be performed through an AC signal using a railroad, with which the high-speed train is in contact. However, in such a system, capacity of the railroad is low and it is difficult to establish more links due to physical restriction that the number of simultaneously connected railroads is restricted to two. Similarly, a power line communication (PLC) method of performing communication using a power line may be used. However, this method has the same disadvantages as the communication method using the railroad and cannot be disadvantageously applied to a train without a power line.

In the present invention, a transmission/reception antenna structure for providing high-speed data communication in such a communication environment is proposed and a method of improving a multi-antenna scheme in a conventional LTE/LTE-A or IEEE 802.16m system so as to minimize pilot overhead and ensure more data capacity is proposed.

DISCLOSURE

Technical Problem

An object of the present invention is to provide a communication system for a high-speed object moving on a fixed path.

The technical problems solved by the present invention are not limited to the above technical problems and other technical problems which are not described herein will become apparent to those skilled in the art from the following description.

Technical Solution

The object of the present invention can be achieved by providing a method of transmitting a data signal from a transmitter to a receiver in a multi-antenna wireless communication system, the method including transmitting information about the number of transmission antennas of the transmitter to the receiver, receiving information about the number of effective communication links between the transmitter and the receiver from the receiver, determining a precoding matrix based on the information about the number of effective communication links, and transmitting the data signal to the receiver using the precoding matrix, wherein at least one of the transmission antennas of the transmitter establishes an effective communication link with one of the reception antennas of the receiver.

The transmitting the information about the number of transmission antennas may include transmitting reference signals respectively corresponding to the transmission antennas to the receiver. The reference signals respectively corresponding to the transmission antennas may be circularly allocated to the transmission antennas according to the number of reference signals.

The information about the number of effective communication links may be information about the size of the precoding matrix. The size of the precoding matrix may be the number of effective communication links×the number of data layers.

In another aspect of the present invention, there is provided a transmission apparatus in a multi-antenna wireless communication system, including a transmission module configured to transmit information about the number of transmission antennas of the transmission apparatus to a reception apparatus, a reception module configured to receive information about the number of effective communication links between the transmission apparatus and the reception apparatus from the reception apparatus, and a processor configured to determine a precoding matrix based on the information about the number of effective communication links, wherein the transmission module transmits the data signal to the reception apparatus using the precoding matrix, and wherein at least one of the transmission antennas of the establishes an effective communication link with one of the reception antennas of the reception apparatus.

The transmission module may transmit the information about the number of transmission antennas to the reception apparatus and transmit reference signals respectively corresponding to the transmission antennas to the reception apparatus. In this case, the reference signals respectively corresponding to the transmission antennas may be circularly allocated to the transmission antennas according to the number of reference signals.

Advantageous Effects

According to a communication system of the present invention, it is possible to significantly improve communication efficiency and performance of users in an object moving at a very high speed.

The effects of the present invention are not limited to the above-described effects and other effects which are not described herein will become apparent to those skilled in the art from the following description.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user end device such as a user equipment (UE) and a mobile station (MS), and a base station includes a node of a network end communicating with a terminal or a device, such as a Node-B, an eNode B, and a base station.

Figure 1:
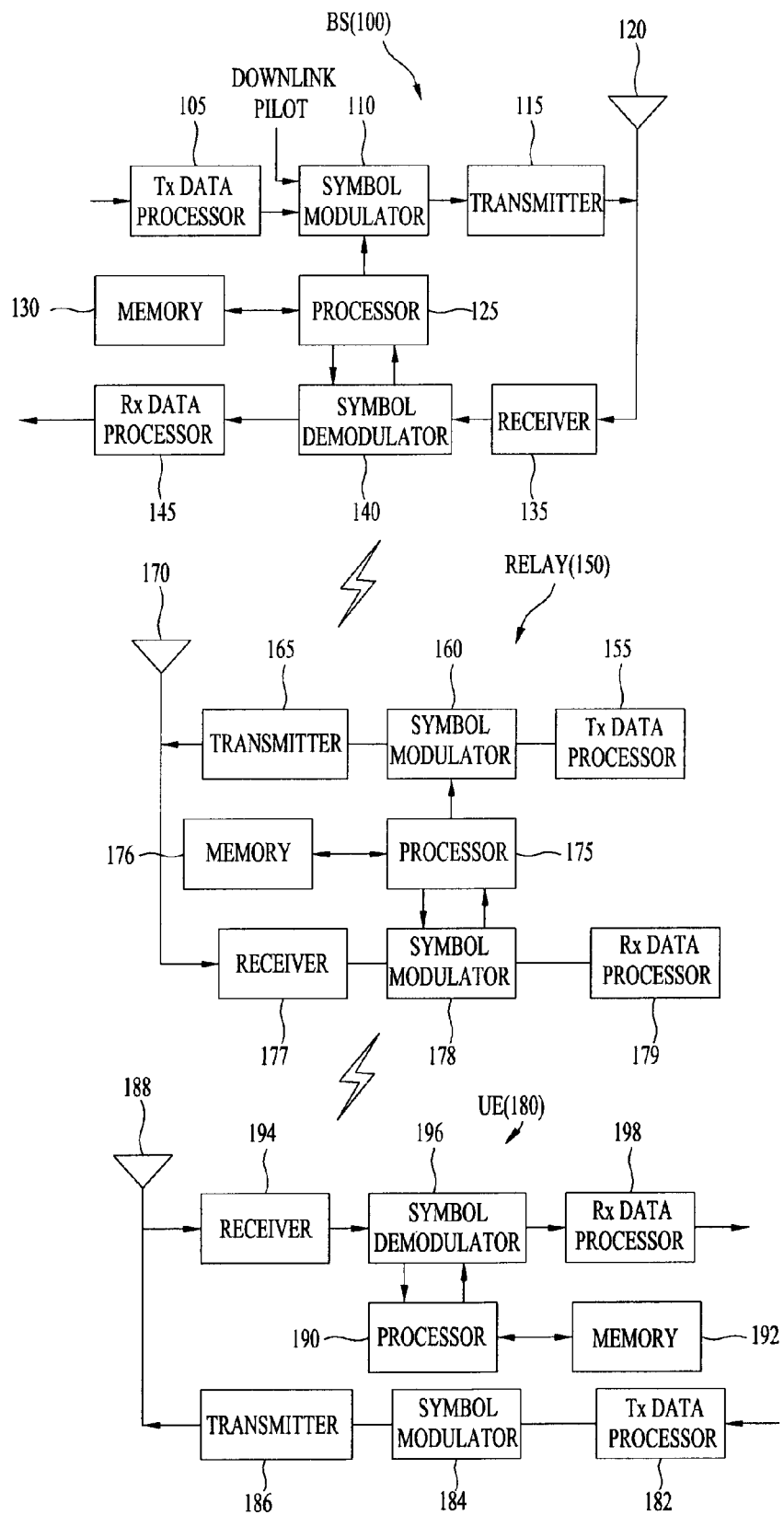
FIG. 1 is a block diagram showing the configuration of a communication system according to the present invention.

FIG. 1 is a block diagram showing the configuration of a communication system according to the present invention.

The communication system according to the present invention includes a base station (BS) 100, a relay 150, a user equipment (UE) 180 and a network (not shown). Although one BS, one relay 200 and one UE 300 are shown for simplicity of the communication system, the wireless communication system according to the present invention may include a plurality of BSs, relays and UEs.

Referring to FIG. 1, the BS 100 may include a transmission (Tx) data processor 105, a symbol modulator 110, a transmitter 115, a Tx/Rx antenna 120, a processor 125, a memory 130, a receiver 135, a symbol demodulator 140 and a reception (Rx) data processor 145. The relay 150 may include a Tx data processor 155, a symbol modulator 160, transmitter 165, a Tx/Rx antenna 170, a processor 175, a memory 176, a receiver 177, a symbol demodulator 178 and an Rx data processor 179. The UE 180 may include a Tx data processor 182, a symbol modulator 184, a transmitter 186, a Tx/Rx antenna 188, a processor 190, a memory 192, a receiver 194, a symbol demodulator 196 and an Rx data processor 198.

Although one antenna 120, one antenna 170 and one antenna 188 are respectively shown as being included in the BS 100, the relay 150 and the UE 180, each of the BS 100, the relay 150 and the UE 180 may include a plurality of antennas. Accordingly, the BS 100, the relay 150 and the UE 180 according to the present invention support a multiple input multiple output (MIMO) system. The BS 100, the relay 150 and the UE 180 according to the present invention may support both a single user (SU)-MIMO scheme and a multi user (MU)-MIMO scheme.

In downlink, the Tx data processor 105 of the BS 100 receives traffic data, formats and codes the received traffic data, interleaves and modulates (or symbol-maps) the coded traffic data, and provides modulated symbols ("data symbols"). The symbol modulator 110 receives and processes the data symbols and pilot symbols and provides a stream of the symbols.

The symbol modulator 110 of the BS 100 multiplexes data and pilot symbols and transmits the multiplexed data and pilot symbols to the transmitter 115. At this time, each transmitted symbol may include a data symbol, a pilot symbol, or a zero signal value. The pilot symbols may be contiguously transmitted in symbol periods. The pilot symbols may include frequency division multiplexing (FDM) symbols, orthogonal frequency division multiplexing (OFDM) symbols, time division multiplexing (TDM) symbols or code division multiplexing (CDM) symbols.

The transmitter 115 of the BS 100 receives the stream of the symbols, converts the stream to one or more analog signals, and additionally adjusts (e.g., amplifies, filters and frequency up-converts) the analog signals, thereby generating a downlink signal suitable for transmission through a radio channel. Subsequently, the downlink signal is transmitted to a UE through the antenna 120.

The reception antenna 170 of the relay 150 may receive a downlink signal from the BS 100. The processor 175 of the relay 150 may demodulate the downlink signal received from the BS 100 and transmit the demodulated downlink signal to the UE 110 through the transmission antenna 170. In addition, the reception antenna 170 of the relay 150 may receive an uplink signal from the UE 110. The processor 175 of the relay 150 may demodulate the uplink signal received from the UE and transmit the demodulated uplink signal to the BS 100.

In the UE 180, the antenna 188 receives a downlink signal from the BS 100 or the relay 150 and provides the received signal to the receiver 194. The receiver 194 adjusts (for example, filters, amplifies, and frequency down-converts) the received signal, digitalizes the adjusted signal, and acquires samples. The symbol demodulator 198 demodulates the received pilot symbols and provides the demodulated pilot signals to the processor 190, for channel estimation.

The symbol demodulator 196 receives a frequency response estimation value for downlink from the processor 190, performs data demodulation with respect to the received data symbols, acquires data symbol estimation values (which are estimation values of the transmitted data symbols), and provides the data symbol estimation values to the Rx data processor 198. The Rx data processor 150 demodulates (that is, symbol-demaps), deinterleaves and decodes the data symbol estimation values and restores the transmitted traffic data.

The processes by the symbol demodulator 196 and the Rx data processor 198 are complementary to the processes by the symbol modulator 110 and the Tx data processor 105 of the BS 100.

In the UE 180, the Tx data processor 182 processes traffic data and provides data symbols in uplink. The symbol modulator 184 receives the data symbols, multiplexes the data symbols with pilot symbols, performs modulation, and provides a stream of symbols to the transmitter 186. The transmitter 186 receives and processes the stream of symbols, generates an uplink signal, and transmits the uplink signal to the BS 100 or the relay 150 through the antenna 135.

In the BS 100, the uplink signal is received from the UE 100 through the antenna 130. The receiver 190 processes the received uplink signal and acquires samples. Subsequently, the symbol demodulator 195 processes the samples and provides pilot symbols and data symbol estimation values received in uplink. The Rx data processor 197 processes the data symbol estimation values and restores the traffic data transmitted from the UE 180.

The respective processors 125, 175 and 190 of the BS 100, the relay 150 and the UE 180 instruct (for example, control, adjust, or manage) the operations of the BS 100, the relay 150 and the UE 180, respectively. The processors 125, 175 and 190 may be connected to the memories 130, 176 and 192 for storing program codes and data, respectively. The memories 130, 176 and 192 are respectively connected to the processors 125, 175 and 190 so as to store operating systems, applications and general files.

The processors 125, 175 and 190 may be called controllers, microcontrollers, microprocessors, microcomputers, etc. The processors 125, 175 and 190 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 125, 175 and 190.

If the embodiments of the present invention are implemented by firmware or software, the firmware or software may be configured to include modules, procedures, functions, etc. for performing the functions or operations of the present invention. The firmware or software configured to perform the present invention may be included in the processors 125, 175 and 190 or may be stored in the memories 130, 176 and 192 so as to be driven by the processors 125, 175 and 190.

Layers of the radio interface protocol between the BS 100, the relay 150 and the UE 180 in the wireless communication system (network) may be classified into a first layer (L1), a second layer (L2) and a third layer (L3) based on the three low-level layers of the known Open System Interconnection (OSI) model of a communication system. A physical layer belongs to the first layer and provides an information transport service through a physical channel. A Radio Resource Control (RRC) layer belongs to the third layer and provides control radio resources between the UE 180 and the network. The BS 100, the relay 150 and the UE 180 exchange RRC messages with each other through a wireless communication network and the RRC layer.

A communication method which may be used by passengers of a high-speed train includes a method of enabling a passenger to directly access a mobile communication network and a method of connecting a network and a passenger using a high-speed train as a relay. In the latter method, the number of times of handover is reduced as compared to the former method and a relative speed between the relay and the passenger is not present, such that more data is exchanged using a further improved method such as a closed loop (CL)-MIMO method. In the present specification, as in the latter method, a method for enabling a high-speed train to function as a mediator in data communication between a network and a passenger and maximizing link capacity between the network and the high-speed train is proposed.

Hereinafter, a method of establishing a link between a high-speed object (e.g., a high-speed train) and a network in a communication system according to the present invention in a wireless manner will be described and, more particularly, a method of maximizing link capacity between a network and a high-speed object using a plurality of antennas will be described.

Figure 2:
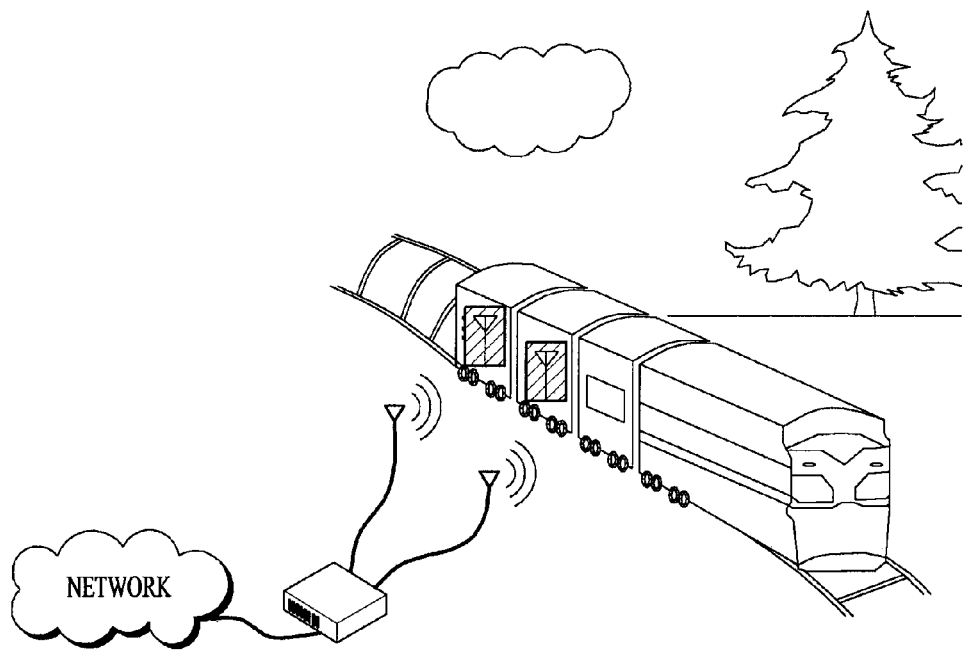
FIG. 2 is a diagram showing an example of a communication system according to an embodiment of the present invention.

FIG. 2 is a diagram showing an example of a communication system according to an embodiment of the present invention.

Referring to FIG. 2, a network and a base station 100 connected to the network are included in the communication system. The BS may be an access point (AP), a macrocell BS, a femtocell BS, etc. The BSs may be arranged at a predetermined interval along a railroad or a track of a high-speed object (hereinafter, for example, a high-speed train will be described as a high-speed object). A BS covering a specific region may include a plurality of antennas. A BS and a plurality of antennas of the BS may be connected in a wired or wireless manner.

Transmit power of a transmission antenna of a BS and a distance between transmission antennas (or transmission antenna groups) or reception antennas (or reception antenna groups) are controlled such that one transmission antenna (or one transmission antenna group) has influence only on one reception antenna (or one reception antenna group). In this case, one antenna group of a train and one antenna group of a BS may establish a communication link in 1:1. The reception antenna group may be composed of one or more physical antennas and one reception antenna group may be formed in each car in the case of a high-speed train.

Figure 3:
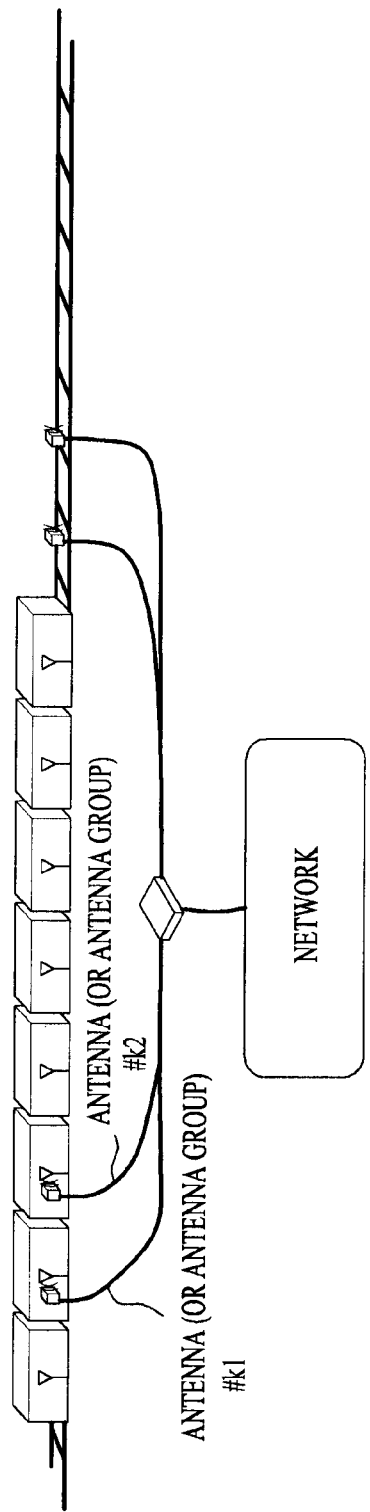
FIG. 3 is a diagram showing an example of antenna arrangement in a communication system according to an embodiment of the present invention.

FIG. 3 is a diagram showing an example of antenna arrangement in a communication system according to an embodiment of the present invention. In particular, FIG. 3 shows the case in which reception antennas (or reception antenna groups) greater in number than the number of transmission antennas of a BS are mounted in a portion corresponding to the entire length of a high-speed train.

Referring to FIG. 3, only some reception antennas (or reception antenna groups) of the high-speed train may establish a communication channel. In addition, the reception antennas (or the reception antenna groups) which establish a communication channel of effective quality may be changed as the high-speed train moves.

Figure 4:
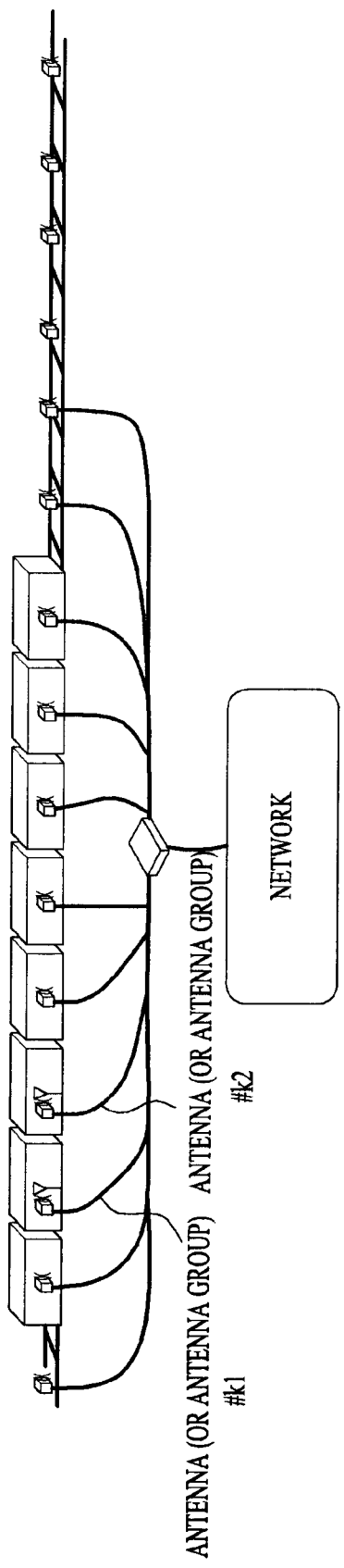
FIG. 4 is a diagram showing another example of antenna arrangement in a communication system according to an embodiment of the present invention.

FIG. 4 is a diagram showing another example of antenna arrangement in a communication system according to an embodiment of the present invention. In particular, FIG. 4 shows the case in which the number of transmission antennas (or transmission antenna groups) of a BS is greater than or equal to the number of reception antennas (or reception antenna groups) of the high-speed train in a portion corresponding to the entire length of a high-speed train.

Referring to FIG. 4, all reception antennas of the train become the reception antennas (or the reception antenna groups) of the high-speed train which establish a communication channel of effective quality regardless of movement of the high-speed train.

Since the transmission antennas (or the transmission antenna groups) which establish a communication channel of effective quality are changed according to movement of the high-speed train, the AP may perform data transmission only using specific transmission antennas (or specific transmission antenna groups) according to movement of the train. Specific transmission antennas (or specific transmission antenna groups) of the BS may be selected from among transmission antennas (or transmission antenna groups) of a predicted path or transmission antennas (or transmission antenna groups) in which power of a signal received from a reception antenna is greater than or equal to a threshold, in consideration of the track and speed of the train. Transmission antennas (or transmission antenna groups) physically arranged close to the antennas (groups) determined in consideration of prediction or measurement error in both methods may also participate in transmission.

In such an antenna structure and arrangement, user IDs may be respectively allocated to reception antennas (or reception antenna groups) and independently managed, such that a communication link is independently managed according to reception antennas (or reception antenna groups). However, if the user IDs are independently managed according to the reception antennas (or the reception antenna groups), the number of user IDs is increased and overhead of a control channel such as a MAP or a PDCCH is increased. Thus, the reception antennas (or the reception antenna groups) are preferably treated as multiple antennas of a single ID.

Unlike a UE such as a general terminal or laptop, in the communication system of the present invention, one reception antenna (or one reception antenna group) establishes a communication channel of effective quality with one transmission antenna (or one transmission antenna group) and establishes a negligible channel with other transmission antennas (or other transmission antenna groups), thereby utilizing a pilot as well as data in a state of overlapping the same radio resources.

In a conventional 3GPP2 IEEE 802.16m system or 3GPP LTE system, the number $N_{Tx}$ of transmission antennas of a BS is a system parameter which is regardless of the number of reception antennas of a UE. The BS transmits the number $N_{Tx}$ of transmission antennas in a broadcast or unicast manner in the form of a message or implicitly signals the number $N_{Tx}$ of transmission antennas via a specific downlink signal or channel.

All UEs may confirm the configuration of a pilot signal transmitted by a BS or the size $N_{Tx} \times N_{rank}$ of a precoding matrix used when the BS performs downlink transmission, using information about the number $N_{Tx}$ of transmission antennas. Here, $N_{rank}$ denotes the number of symbols which may be simultaneously transmitted in one tone, is referred to as the number of MIMO streams in the 3GPP2 IEEE 802.16m system, and is referred to as the number of transmission layers in the 3GPP LTE system.

$N_{rank}$ may be changed according to the channel state of each UE or the purpose of using radio resources, but $N_{Tx}$ is constant. That is, UEs which receive downlink data to which a precoding matrix is applied feed a PMI back to a BS using a codebook corresponding to $N_{Tx}$ or feed a channel covariance matrix or a channel correlation matrix having a size of $N_{Tx} \times N_{Tx}$ back to the BS. Then, the UEs may receive data from the BS using radio resources precoded with a precoding matrix having a size of $N_{Tx} \times N_{rank}$.

However, as shown in FIGS. 2 to 4, since the number of channels of effective quality may be changed according to movement of the high-speed train and the number of channels of effective quality may be changed according to the number and arrangement of reception antennas mounted in the train, the BS informing the UE (or the high-speed train) of information about $N_{Tx}$ may mean that the BS informs the UE of the number of reference signals, such as CRSs, CSI-RSs or midambles, capable of measuring respective channels transmitted by the transmission antennas (or the transmission antenna groups).

In this case, a high-speed train, that is, a relay, measures the number of effective channels using reference signals, etc., determines the size of a precoding matrix using the number of effective channels, and feeds the size of the precoding matrix back to a BS. The size of the precoding matrix includes the number of effective channels and $N_{rank}$, which are fed back to the BS together or individually.

Alternatively, $N_{rank}$ may be defined to be identical to the number of effective channels in advance and thus may not be fed back to the BS. For example, in FIG. 4, if a train A includes eight reception antennas to establish eight effective channels and a train B includes four reception antennas to establish four effective channels, the size of a precoding matrix which may be used by a BS for the train A becomes $8 \times N_{rank}$ and the size of a precoding matrix for the train B becomes $4 = N_{rank}$.

In addition, if the train A moves and passes through a place where an antenna is mounted as shown in FIG. 3, the size of a precoding matrix for the train A becomes $2 \times N_{rank}$. That is, even when UEs are connected to one BS, the BS supports downlink with respect to the respective UEs using different numbers of transmission antennas and supports downlink with respect to one UE using different numbers of transmission antennas according to time or position.

In the communication system described with reference to FIGS. 2 to 4, although many transmission antennas are mounted in a BS, the number of reference signals may be limited. Accordingly, in the present invention, a method of circularly utilizing reference signals is proposed. That is, in the example shown in FIG. 4, a BS signals $N_{Tx}$ in a broadcast or unicast manner and then transmits $N_{Tx}$ reference signal sequences $\{S_1, S_2, \ldots, S_{N_{Tx}}\}$ in the form of CRSs, CSI-RSs or midambles.

At this time, if reference signals are circularly allocated according to transmission antennas (or transmission antenna groups) as in $\{\ldots, S_1, S_2, \ldots, S_{N_{Tx}}, S_1, S_2, \ldots, S_{N_{Tx}}, \ldots\}$, the high-speed train may measure the number of transmission antennas (or transmission antenna groups), with which an effective communication link is established, using the reference signals, which will be respectively described in downlink and uplink.

First, in downlink transmission, if a plurality of antennas is mounted in a BS, it is assumed that the number of transmission antennas which establish a channel of effective quality is changed according to the channel state of a UE. That is, if $N_{Tx}$ transmission antennas are mounted in the BS and CRSs, CSI-RSs or midambles corresponding thereto are provided to the UE, the UE, that is, the high-speed train, may feed information about transmission antennas of effective channels back to the BS using such reference signals. Based upon such feedback information, data may be transmitted using a precoding matrix in order to use only an effective communication link among links between the BS and the high-speed train. Alternatively, the BS and the high-speed train may transmit data using a codebook corresponding to the number of effective transmission antennas or a channel correlation matrix or a channel covariance matrix corresponding thereto.

Next, in uplink transmission, as shown in FIG. 3, the number of transmission antennas supporting uplink from a high-speed train to a BS is actually eight, but the number of transmission antennas of the high-speed train, which is detected by the BS, is two. In this case, the UE does not inform the BS that the number of transmission antennas of the high-speed train is eight as in the conventional system, but informs the BS that the number of transmission antennas of the high-speed train which establish a channel of effective quality is two.

The number of transmission antennas of the high-speed train may be measured by the high-speed train using reference signals such as CRSs, CSI-RSs or midambles of downlink and fed back to the BS. Similarly to downlink, since the number of transmission antennas of uplink may be changed according to time and position of the high-speed train, the number of transmission antennas may be periodically or aperiodically signaled to the BS.

As described above, a feature that $N_{Tx}$ and the number of channels of effective quality (or the number of effective transmission antennas) may be different and information about the type of the BS (macro BS, femto BS, etc.) may be signaled by the BS through a capability negotiation procedure upon initial network establishment, may be signaled through a broadcast/unicast method of a system parameter, or may be signaled from a BS of another cell to a UE, that is, a high-speed train, during a handover process.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

INDUSTRIAL APPLICABILITY

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of transmitting a data signal from a transmitter to a receiver in a multi-antenna wireless communication system, the method comprising:
   transmitting information on a number of transmission antennas of the transmitter and reference signals respectively corresponding to the transmission antennas to the receiver;
   receiving information on a number of effective communication links between the transmitter and the receiver and information on effective transmission antennas of the transmitter which establishes the effective communication links, from the receiver;
   determining a precoding matrix based on the information on the number of effective communication links, wherein the number of effective communication links is less than the number of transmission antennas;
   mapping the data signal to the effective transmission antennas using the precoding matrix; and
   transmitting the mapped data signal to the receiver,
   wherein each of the effective transmission antennas establishes an effective communication link with one of reception antennas of the receiver, and
   wherein the number of the effective communication links and the effective transmission antennas are determined based on the reference signals.

2. The method according to claim 1, wherein, when a plurality of effective communication links is established, the plurality of effective communication links is independent of each other.

3. The method according to claim 1, wherein the reference signals respectively corresponding to the transmission antennas are circularly allocated to the transmission antennas according to the number of reference signals.

4. The method according to claim 2, wherein the information on the number of the effective communication links is information on size of the precoding matrix.

5. The method according to claim 4, wherein the size of the precoding matrix is the number of the effective communication links×the number of data layers.

6. A transmission apparatus in a multi-antenna wireless communication system, the transmission apparatus comprising:
   a transmission module configured to transmit information on a number of transmission antennas of the transmission apparatus to a reception apparatus and transmit reference signals respectively corresponding to the transmission antennas to the receiver;
   a reception module configured to receive information on a number of effective communication links between the transmission apparatus and the reception apparatus and information on effective transmission antennas of the transmission apparatus which establishes the effective communication links, from the reception apparatus; and
   a processor configured to determine a precoding matrix based on the information on the number of effective communication links and map the data signal to the effective transmission antenna using the precoding matrix, wherein the number of effective communication links is less than the number of transmission antennas,
   wherein the transmission module transmits the mapped data signal to the reception apparatus,
   wherein each of the effective transmission antennas establishes an effective communication link with one of reception antennas of the reception apparatus, and
   wherein the number of the effective communication links and the effective transmission antennas are determined based on the reference signals.

7. The transmission apparatus according to claim 6, wherein, when a plurality of effective communication links is established, the plurality of communication links is independent of each other.

8. The transmission apparatus according to claim 7, wherein the reference signals respectively corresponding to the transmission antennas are circularly allocated to the transmission antennas according to the number of reference signals.

9. The transmission apparatus according to claim 7, wherein the information on the number of the effective communication links is information on size of the precoding matrix.

10. The transmission apparatus according to claim 9, wherein the size of the precoding matrix is the number of the effective communication links×the number of data layers.

* * * * *